United States Patent
Mizoguchi

(10) Patent No.: US 7,215,796 B2
(45) Date of Patent: May 8, 2007

(54) METHOD AND APPARATUS FOR REGISTERING PALM PATTERN IMPRESSION

(75) Inventor: Masanori Mizoguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 707 days.

(21) Appl. No.: 10/326,171

(22) Filed: Dec. 23, 2002

(65) Prior Publication Data

US 2003/0118215 A1    Jun. 26, 2003

(30) Foreign Application Priority Data

Dec. 25, 2001    (JP) .............................. 2001-391366

(51) Int. Cl.
  *G06K 9/00*      (2006.01)
  *G05B 19/00*    (2006.01)

(52) U.S. Cl. .................... 382/115; 340/5.53; 902/3; 713/186

(58) Field of Classification Search ........ 382/115–127; 340/5.1, 5.2, 5.52, 5.53; 902/3; 356/71; 713/186

See application file for complete search history.

(56) References Cited

U.S. PATENT DOCUMENTS 5,526,436 A * 6/1996 Sekiya ........................ 382/115
5,528,355 A * 6/1996 Maase et al. .................. 356/71
6,370,263 B1 * 4/2002 Hiratsuka et al. ........... 382/115
2004/0264742 A1 * 12/2004 Zhang et al. ................ 382/115

FOREIGN PATENT DOCUMENTS

JP    63-145528    6/1988
JP    10-255051    9/1998
JP    11-203474    7/1999

OTHER PUBLICATIONS

Japanese Office Action with partial English translation, dated Oct. 26, 2005.

* cited by examiner

*Primary Examiner*—Jingge Wu
*Assistant Examiner*—Aaron Carter
(74) *Attorney, Agent, or Firm*—McGinn IP Law Group, PLLC

(57) ABSTRACT

A method detecting a rectangle enclosed by a pair of parallel horizontal lines that are demarcation lines between the palm pattern impression and the background in wrist-side and fingertip-side, and a pair of parallel vertical lines are orthogonal to the horizontal lines and are demarcation lines between the palm pattern impression and the background in thumb-side and little-finger-side. The method splits the rectangle into, three segments horizontally by four segments vertically, and then splits the palm pattern impression into three regions, the first being a combination of three segments horizontally by two segments vertically located toward the fingertip among the segments, the second being a combination of two segments horizontally by three segments vertically located toward the thumb and the wrist among the segments, and the third region being a combination of two segments horizontally by three segments vertically located toward the little finger and the wrist among the segments.

19 Claims, 8 Drawing Sheets

METHOD AND APPARATUS FOR REGISTERING PALM PATTERN IMPRESSION

BACKGROUNDS OF THE INVENTION

1. Field of the Invention

The present invention relates to a method and apparatus for registering palm pattern impression impressed by each of different individuals who are subject to personal identification by use of a computer system, for the purpose of personal identification. In particular, the present invention relates to a method and apparatus for registering palm pattern impressions through simplified means that does not rely on human hands, thereby reducing the time required for the registration process.

2. Description of the Related Art

Fingerprints are said to be the physical feature information most commonly used in personal identification and personal authentication for the purpose of verifying that an individual is really the person whom he or she claims to be. Features that can be obtained from fingerprint ridges (bifurcations and endpoints) vary from person to person and do not change for life.

Because of these characteristics, a number of apparatuses have been disclosed that utilize features obtained from fingerprint ridges to conduct personal authentication. Also known are other apparatuses based on a similar concept that utilize features obtained from ridges of palm patterns existing in palms for personal authentication.

To date, several methods and apparatuses that split and register palm pattern impressions have been proposed with the aim of reducing the time required for matching palm pattern data by limiting the search area to deal with when collating palm pattern impressions.

One of these arts is disclosed in Japanese Patent No. 002944602, entitled "Method and Apparatus for Registering Palm Pattern Impression." As shown in FIG. 8, this art splits a palm pattern impression into three regions for more efficient registration, using a pad split line that connects the impression end point 86 between the middle finger and the ring finger with the point of intersection (arm trident) 87 between the Life line 85 and the wrist-side impression end, and a base split line that is orthogonal to the pad split line and that runs through the point of intersection 88 between the Heart line 84 and the impression end. These regions are called interdigital region 81, which is the area around the roots of the four fingers; thenar region 82, which is the area around the root of the thumb; and hypothenar region 83, which is the remaining area.

The above-described conventional methods and apparatuses for registering palm pattern impressions, however, hold several problems, as described below.

The first problem is that the points to serve as reference points, e.g., the middle point between the middle finger and the ring finger, the arm trident, the point of intersection between the Life line and the impression end, and the point of intersection between the Heart line and the impression end, do not appear clearly in some palm pattern impression images with lower image quality. On these images, only experts who are familiar with the characteristics of palm patterns can infer the coordinates of these points correctly.

The second problem is that the process of splitting a palm pattern impression into regions relies on visual inspection. In other words, these arts require the intervention of human hands during the region splitting process for the registration of the images of impressed palm patterns, requiring an enormous number of man-hours by experts to build a large-scale palm pattern database.

The third problem is that the need to utilize the data registered in this palm pattern database may very often arise when palm pattern data are re-registered using a new region splitting method. Since the palm pattern database has already been built using the above-mentioned art, difficulties should be encountered in meeting such need. In order for this need to be met easily, it is necessary to limit the search areas to those that are equivalent to the three regions used in the conventional arts, i.e., interdigital region, thenar region, and hypothenar region, thereby eliminating the necessity to newly execute the region splitting process.

SUMMARY OF THE INVENTION

The object of the present invention is to provide a method and apparatus for registering palm pattern impressions that can simplify the process of splitting a palm pattern impression into multiple regions by eliminating the necessity of the intervention of expert human hands, that can also support the use of a database built through the conventional method of splitting a palm pattern impression into three regions, i.e., interdigital region, thenar region, and hypothenar region, and that can reduce the time required for collation by narrowing the search area.

According to the first aspect of the invention, a method for registering palm pattern impression impressed by each of different individuals who are subject to personal identification, comprises the steps of when splitting said palm pattern impression into the pre-determined multiple regions and registering the features extracted from each of the regions as feature information on a region-to-region basis, detecting a rectangular area enclosed by a pair of horizontal lines on the wrist side and the fingertip side and a pair of vertical lines on the thumb side and the little finger side that are orthogonal to said horizontal lines, splitting said rectangular area into segments using lines that are parallel to said horizontal lines and said vertical lines, respectively, and splitting said palm pattern impression into multiple regions by merging said segments according to the pre-determined combinations.

In the preferred construction, the method for registering palm pattern impressions further comprises the step of detecting said rectangular area as an area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background.

In another preferred construction, the method for registering palm pattern impression further comprises the step of registering said feature information by associating with personal identification information to be input separately.

In another preferred construction, the method for registering palm pattern impression further comprises the steps of detecting said rectangular area as an area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background, and registering said feature information by associating with personal identification information to be input separately.

In another preferred construction, the method for registering palm pattern impression further comprises the steps of splitting said rectangular area into a total of twelve segments, arranged with three segments horizontally by four segments vertically, using two equidistant lines that are parallel to said horizontal lines and three equidistant lines that are parallel to said vertical lines, and splitting said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

In another preferred construction, the method for registering palm pattern impressions further comprises the steps of detecting said rectangular area as an area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background, splitting said rectangular area into a total of twelve segments, arranged with three segments horizontally by four segments vertically, using two equidistant lines that are parallel to said horizontal lines and three equidistant lines that are parallel to said vertical lines, and splitting said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

In another preferred construction, the method for registering palm pattern impression further comprises the steps of registering said feature information by associating with personal identification information to be input separately, splitting said rectangular area into a total of twelve segments, arranged with three segments horizontally by four segments vertically, using two equidistant lines that are parallel to said horizontal lines and three equidistant lines that are parallel to said vertical lines, and splitting said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

In another preferred construction, the method for registering palm pattern impression further comprises the steps of detecting said rectangular area as an area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background, registering said feature information by associating with personal identification information to be input separately, splitting said rectangular area into a total of twelve segments, arranged with three segments horizontally by four segments vertically, using two equidistant lines that are parallel to said horizontal lines and three equidistant lines that are parallel to said vertical lines, and splitting said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

According to the second aspect of the invention, an apparatus for registering palm pattern impression impressed by each of different individuals who are subject to personal identification, comprises an image displaying means for displaying said palm pattern impression as image data, a region splitting means for detecting a rectangular area enclosed by a pair of horizontal lines on the wrist side and the fingertip side and a pair of vertical lines on the thumb side and the little finger side that are orthogonal to said horizontal lines, splitting said rectangular area into segments, using lines that are parallel to said horizontal lines and said vertical lines respectively, and splitting said palm pattern impression into multiple regions by merging said segments individually according to the pre-determined combinations, a feature extracting means for extracting the features of said palm pattern impression, and a data storing means for registering the features extracted from each of the regions by said feature extracting means that are obtained by splitting by said region splitting means as feature information on a region-to-region basis.

In the preferred construction, said region splitting means detects said rectangular area as an area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background.

In another preferred construction, said data storing means registers said feature information by associating with personal identification information to be input separately.

In another preferred construction, said region splitting means splits said rectangular area into a total of twelve segments, arranged with three segments horizontally by four segments vertically, using two equidistant lines that are parallel to said horizontal lines and three equidistant lines that are parallel to said vertical lines, and splits said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

According to another aspect of the invention, an apparatus for registering palm pattern impression impressed by each of different individuals who are subject to personal identification, comprises an image displaying means for displaying said palm pattern impression as image data, a region splitting means when receiving input of information about a rectangular area enclosed by a pair of horizontal lines on the wrist side and the fingertip side and a pair of vertical lines on the thumb side and the little finger side that are orthogonal to said horizontal lines, splitting said rectangular area into segments, using lines that are parallel to said horizontal lines and said vertical lines respectively, and splitting said palm pattern impression into multiple regions by merging said segments individually according to the pre-determined combinations, a feature extracting means for extracting the features of said palm pattern impression, and a data storing means for registering the features extracted from each of the regions by said feature extracting means that are obtained by splitting by said region splitting means as feature information on a region-to-region basis.

In the preferred construction, said region splitting means accepts information concerning said rectangular area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background.

In another preferred construction, said data storing means registers said feature information by associating with personal identification information to be input separately.

In another preferred construction, said region splitting means splits said rectangular area into a total of twelve segments, arranged with three segments horizontally by four segments vertically, using two equidistant lines that are parallel to said horizontal lines and three equidistant lines that are parallel to said vertical lines, and splits said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

According to a further aspect of the invention, a palm pattern impression registering program for execution on computer to conduct a method for registering palm pattern impression impressed by each of different individuals who are subject to personal identification, comprising the functions of when performing the functions of splitting said palm pattern impression into the pre-determined multiple regions and registering the features extracted from each of the regions as feature information on a region-to-region basis, detecting a rectangular area enclosed by a pair of parallel horizontal lines that are obtained by approximating wrist-side and fingertip-side demarcation lines between the palm pattern impression and the background, and a pair of parallel vertical lines that are orthogonal to said horizontal lines and that are obtained by approximating thumb-side and little-finger-side demarcation lines between the palm pattern impression and the background, splitting said rectangular area into segments using lines that are parallel to said horizontal lines and said vertical lines, respectively, and splitting said palm pattern impression into multiple regions by merging said segments according to the pre-determined combinations.

In the preferred construction, the palm pattern impression registering program comprises the function of registering said feature information by associating with personal identification information to be input separately.

In another preferred construction, the palm pattern impression registering program comprises the function of splitting said rectangular area into a total of twelve segments, arranged with three segments horizontally by four segments vertically, using two equidistant lines that are parallel to said horizontal lines and three equidistant lines that are parallel to said vertical lines, and splitting said palm pattern impression into three regions, i.e., the first region being a combination of three segments horizontally by two segments vertically that are located toward the fingertip among said segments, the second region being a combination of two segments horizontally by three segments vertically that are located toward the thumb and the wrist among said segments, and the third region being a combination of two segments horizontally by three segments vertically that are located toward the little finger and the wrist among said segments.

According to the present invention, in the process of splitting a palm pattern impression into multiple regions, the region splitting process can be simplified to the extent that it does not require expertise concerning palms, because the present invention determines the above-mentioned regions by detecting a rectangular area enclosed by the demarcations between palm patterns and the background and then combining the smaller segments of this rectangular area. By this, it allows an ordinary person to process data after receiving some training or enables a computer to process data automatically without intervention of experts.

Furthermore, according to the present invention, the search and collation process can be conducted on the registered data of palm pattern impressions that were taken from the regions split based on the conventional method, without any modifications. This is because the first, second, and third regions that are obtained by the splitting process based on the method according to the present invention correspond to the three regions (interdigital region, thenar region, and hypothenar region, respectively) that were obtained by the splitting process based on the method disclosed in Japanese Patent No. 002944602, entitled "Method and Apparatus for Registering Palm Pattern Impression."

The present invention can thus reduce the time required for the process of registering palm pattern impressions by minimizing the requirements for the intervention of experts. In addition, the cost and time for re-registering the new data of palm impressions become unnecessary, because the registered data of palm impressions that were split using the conventional art into three regions, i.e., interdigital region, thenar region, and hypothenar region, can be utilized without any modifications.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
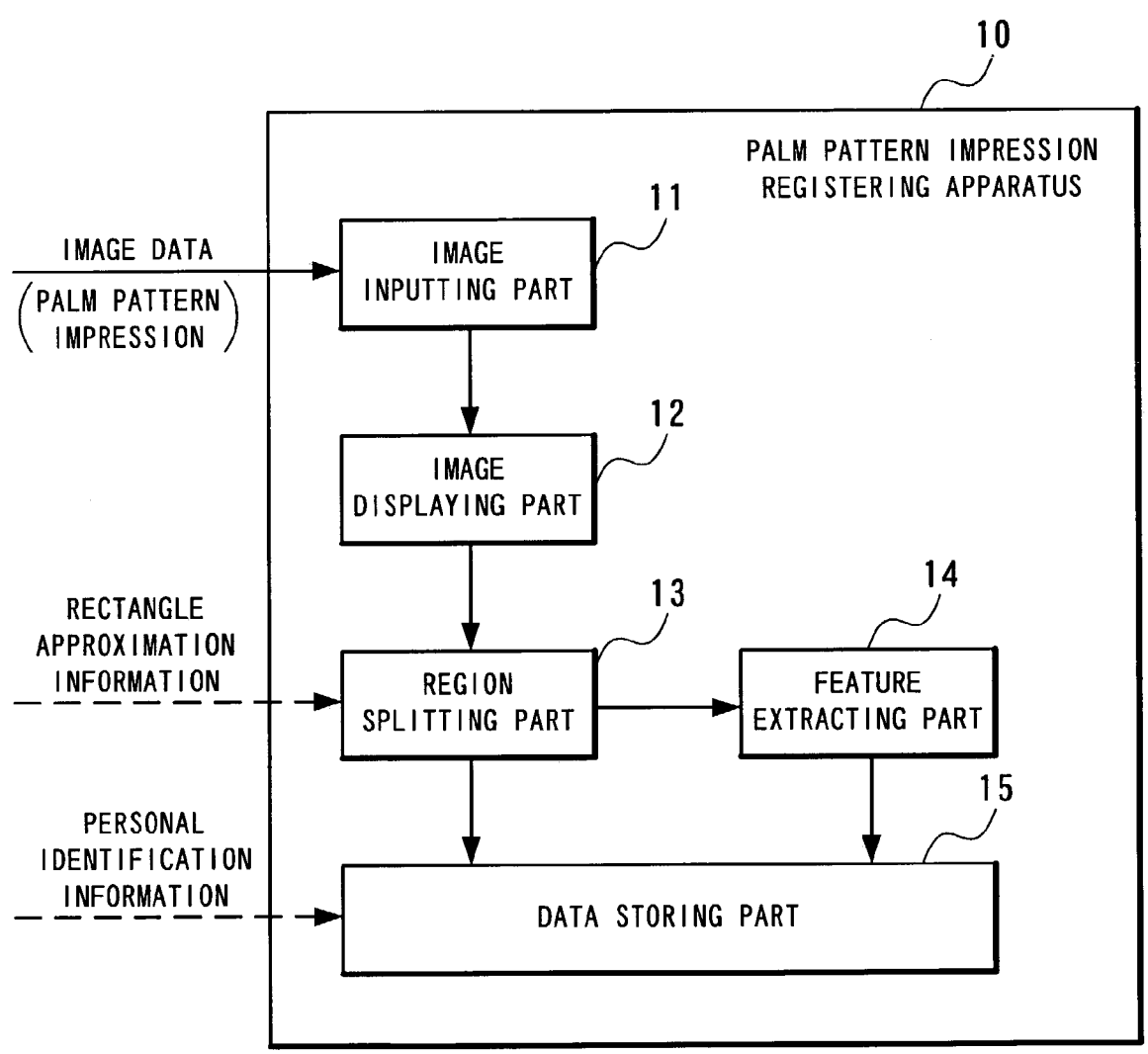
FIG. 1 is a block diagram showing an apparatus for registering palm pattern impressions according to one embodiment of the present invention.

FIG. 1 is a block diagram showing an apparatus for registering palm pattern impressions according to one embodiment of the present invention.

The palm pattern impression registering apparatus 10 according to this embodiment shown in FIG. 1 is provided with an image inputting part 11, e.g., scanner and camera, for inputting palm pattern impressions as image data; an image displaying part 12, e.g., display, for displaying image data of palm pattern impressions; a region splitting part 13 for splitting a palm pattern impression into a pre-determined number of regions; a feature extracting part 14 for extracting features of a palm pattern impression; and a data storing part 15, which is a palm pattern database, for storing features extracted by the feature extracting part 14 separately on a region-to-region basis according to the regions obtained by the splitting part 13. This apparatus is implemented on a commonly used computer system.

Figure 2:
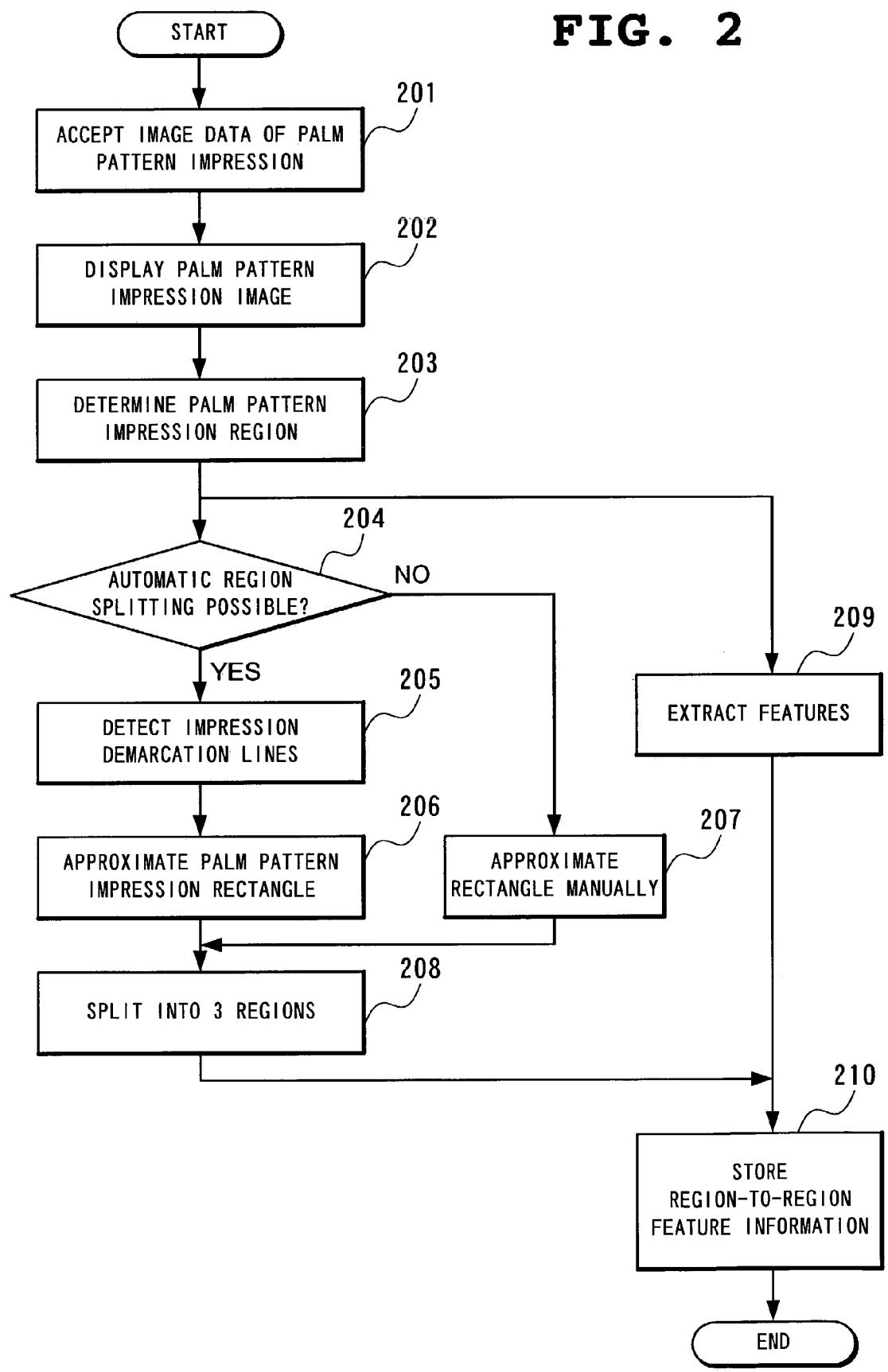
FIG. 2 is a flow chart showing a method for registering palm pattern impressions according to one embodiment of the present invention.

FIG. 2 is a flow chart illustrating a method used by the palm pattern impression registering apparatus 10 shown in FIG. 1 for registering palm pattern impressions. This figure shows how this apparatus splits a palm pattern impression image that was input, into three regions automatically, as well as how it extracts features from the palm pattern impression image and stores these features in the data storing part 15 separately on a region-to-region basis.

First, the image inputting part 11 accepts palm pattern impressions to be registered and stored, as image data (Step 201). The image displaying part 12 displays the entire geometry of the palm pattern impression using the image data accepted by the image inputting part 11 and transmits the image data to the region splitting part 13 (Step 202).

Next, the region splitting part 13 examines each pixel of the image data received from the image displaying part 12 to determine whether the pixel is located in a region in which a palm pattern is impressed and in which any ridge exists or otherwise in a region that is part of the background (Step 203), and transmits the results of the region check for each pixel, together with the image data, to the feature extracting part 14. Following this, the region splitting part 13 determines whether automatic splitting of the palm pattern impression into regions is possible, based on the geography of the regions in which a palm pattern is impressed and in which any ridge exists (Step 204).

If the result of Step 204 above is "Yes," meaning that automatic splitting of the impression into regions is possible, the region splitting part 13 identifies the pixels between the index, middle, ring, and little fingers representing the impression ends that form a demarcation with the background, based on the results of the region check for each pixel in Step 203 above. It then detect the demarcation line with the background on the fingertip-side by connecting these pixels and also detects the demarcation line with the background on the wrist-side, and determines two horizontal lines that form a pair of parallel lines represented by these demarcation lines. Furthermore, the region splitting part 13 detects the demarcation line with the background on the little finger side and also detects the demarcation line with the background on the index finger side that exists between the index finger and the thumb, and determines two vertical lines that form a pair of vertical parallel lines by approximating these demarcation lines in such a way that they are orthogonal to the horizontal lines determined above (Step 205). By this, a rectangular area enclosed by the two horizontal lines and the two vertical lines described above is approximated (Step 206).

On the other hand, if the result of Step 204 above is "No," meaning that automatic splitting of the impression into regions is not possible, the operator enters manually the information that is equivalent to the rectangle approximation determined in Step 206 above, onto the palm pattern impression image that is displayed by the image displaying part 12 (Step 207). This information is transmitted to the region splitting part 13.

The region splitting part 13 then splits the rectangle approximated in Step 206 or 207 above into segments using equidistant lines that are parallel to the above-described horizontal and vertical lines, and determines three regions by combining several of these segments as appropriate (Step 208).

The feature extracting part 14, on the other hand, extracts ridges from the palm part of the palm pattern impression image, based on the results of the region check for each pixel and the image data that it received from the region splitting part 13 in Step 203. In addition, based on these ridges, the feature extracting part 14 extracts Minutia information that is defined by their endpoints and bifurcations, e.g., Minutia's coordinates, ridge directions at the points represented by these coordinates, distances and directions between Minutiae, and the number of ridges that run across Minutiae, and send this as feature information to the data storing part 15 (Step 209).

After this, the data storing part 15 stores the feature information extracted by the feature extracting part 14 separately for each of the three regions that were obtained through the splitting process by the region splitting part 13 (Step 210). At this time, the data storing part 15 may be configured to accept personal identification information that is entered separately and store it together with the image data.

The concept of features or Minutia is well known among those who are engaged in fingerprint matching using the endpoints and bifurcations of fingerprint ridges. This concept is not relevant to the present invention directly, and therefore will not be described in detail herein.

A method for registering palm pattern impressions according to this embodiment will now be described in detail below.

Table 1 shows an example of the format of data to be stored by the data storing part 15 shown in FIG. 1.

TABLE 1

| PARSONAL IDENTIFICATION INFORMATION | |
|---|---|
| FIRST REGION | FEATURE INFORMATION |
| SECOND REGION | FEATURE INFORMATION |
| THIRD REGION | FEATURE INFORMATION |

As shown in Table 1, the data storing part 15 stores feature information that exists in the three regions, i.e., the first region, the second region, and the third region, separately.

The three regions above partly overlap one another, and so does the feature information stored for there regions. Such a constitution gives rise to some redundancy that leads to additional requirements for storage capacity. However, if a constitution in which feature information is derived during the palm pattern collation process on a region-to-region basis is employed, the amount of computation and the search time may increase because feature information must be computed every time the search and collation process is conducted. Considering the amount of computation and the search time that would be required, the advantage of storing information on a region-to-region basis is greater than the disadvantage of redundancy.

Figure 3:
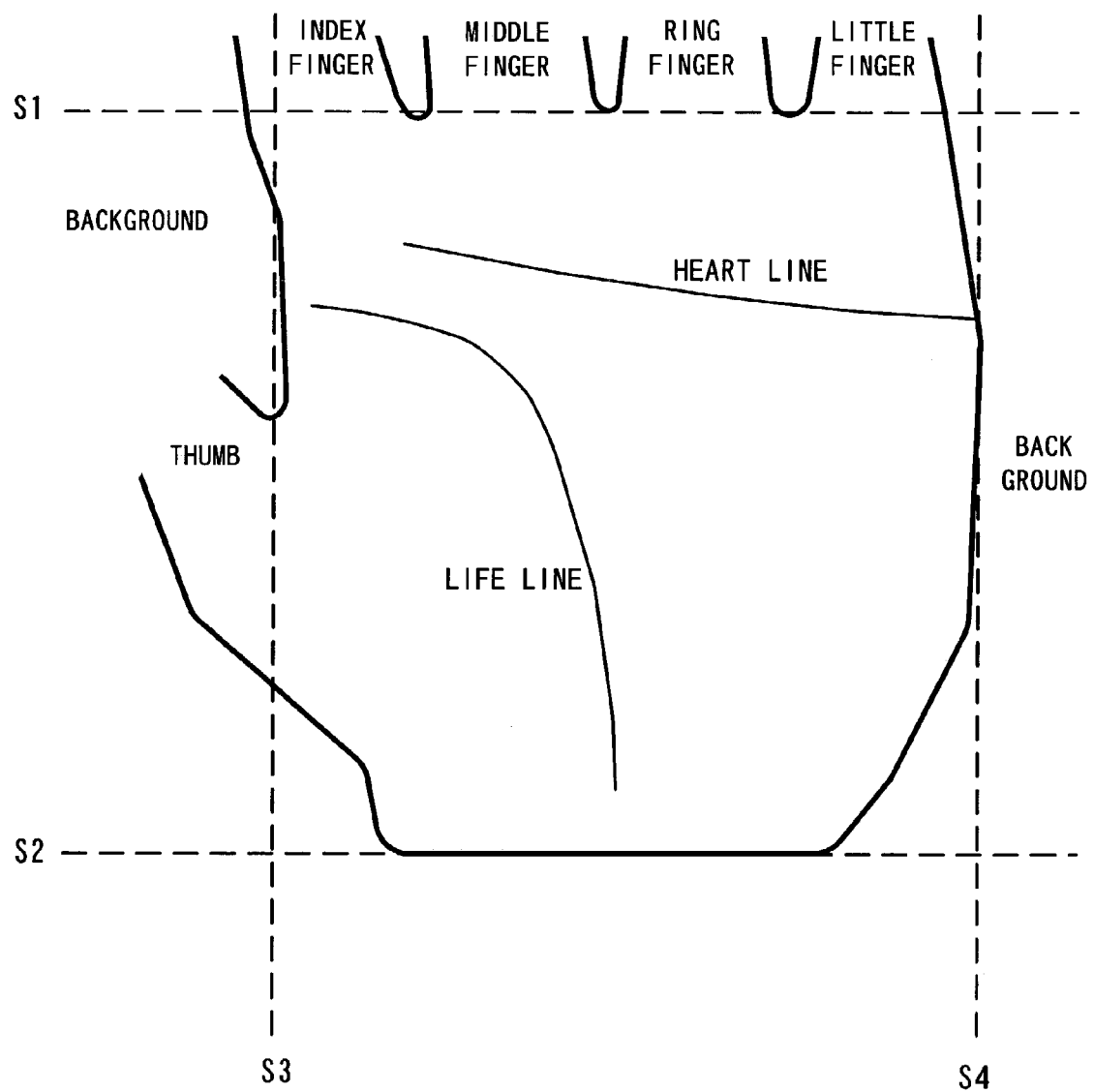
FIG. 3 is a diagram illustrating the rectangle approximation process according to the present invention.

FIG. 3 is a schematic illustration of a palm pattern impression image that is input.

As shown in FIG. 3, a palm represents the region up to the second joint of the thumb, the regions up to the third joints of the index, middle, ring, and little fingers, and the internal side of the wrist. Palm pattern impressions are usually taken to cover the finger part rather widely, since they show clearances between fingers when the areas near the second joints of the index and other fingers are included.

Any palm has large and wide lines. One of the most significant is the line that extends from between the thumb and the index finger to the wrist, which is called the "Life" line. Another is the line that extends horizontally from a little below the root of the little finger to below the index finger, which is called the "Heart" line.

During the process of determining the palm pattern impression regions in Step 203 above according to this embodiment, it is determined, for each pixel of the palm pattern impression image, whether the pixel is located in the palm area or in the background. Identification of a person is determined using ridge patterns in the palm that are peculiar to the person. If the impression is not clear enough, part of the palm pattern impression may lack due to the deep-set surface areas in the center or other parts of the palm. This problem can be solved by using the rule of regarding the parts enclosed by the peripheral areas that have been determined as part of the palm area, also to be part of the palm.

During the process in Step 204 above of determining the possibility of automatic region splitting, determination is made on whether or not the total area of the region determined to be the palm area is equal to or greater than the pre-determined area and whether or not the region determined to be the palm area extends continuously as is usually expected, based on various factors. These factors include whether or not a demarcation line with the background is located in such a region that it should be, and the smoothness of the demarcation line.

During the process in Step 205 above of detecting demarcations between the palm area and the background, four demarcation lines similar to the lines, S1, S2, S3, and S4, in FIG. 3 are detected.

The line S1 is determined by utilizing the fact that the demarcations between the palm area and the background are at the deep-set parts of the roots of the fingers. More specifically, this line is determined by identifying and connecting the pixels located between the index, middle, ring, and little fingers that represent the impression ends forming a demarcation with the background. If these pixels do not form a line, then the line connecting between the third joint of the index finger and the third joint of the little finger is used.

The line S2 is determined by selecting a line that forms a demarcation line with the background on the wrist-side of the palm area and that is parallel to the line S1 across the palm area.

The line S3 is determined by selecting a line from demarcation lines with the background on the index-finger side that exist between the thumb and the index finger and that are orthogonal to the line S1. More specifically, this line should be selected so that a demarcation will be formed at the position a little below the third joint of the index finger (nearer to the wrist).

The line S4 is determined by selecting a line from demarcation lines with the background on the little-finger side that are orthogonal to the line S1. More specifically, this line should be selected so that a demarcation will be formed at the position a little below the third joint of the little finger (nearer to the wrist).

The detection of demarcation lines between the palm pattern impression and the background as described above does not require expert knowledge concerning palms. Even if one does not have knowledge about the Heart line, Life line, and arm trident, he or she can learn to detect these lines after simple training. This simplicity also makes this method suitable to automated processing by a computer.

In determining the demarcation lines, a pre-determined offset can be provided at appropriate positions outside the palm area. By providing such offset, if, for example, the joints of the middle finger and the ring finger extend beyond the demarcation line of the region 1, a region that includes these joints can be specified.

Figure 4:
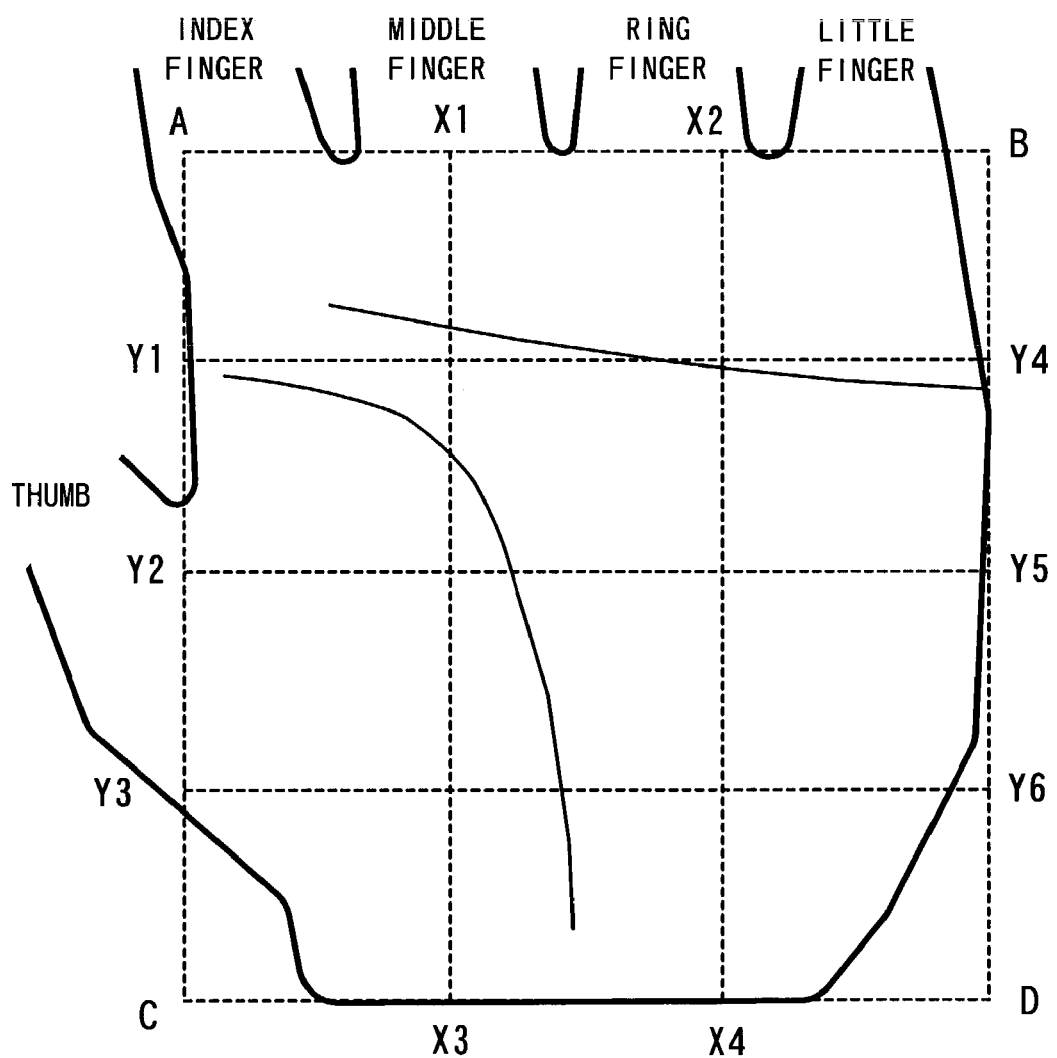
FIG. 4 is a diagram illustrating the processes from rectangle approximation to region splitting according to the present invention.

FIG. 4 is a diagram illustrating the 3-region splitting process in Step 208. In FIG. 4, the rectangle with A, B, C, and D as its vertexes is the rectangle approximated in Step 206 or 207 above.

In the process of splitting the impression into 3 regions in Step 208 above, the rectangle above is first split into 12 segments, arranged with 3 segments vertically by 4 segments vertically, by obtaining the points, X1, X2, X3, and X4, that divide the sides AB and CD into three equal parts and the points, Y1, Y2, Y3, Y4, Y5, and Y6 that divide the sides AC and BD into four equal parts, respectively.

Figure 5:
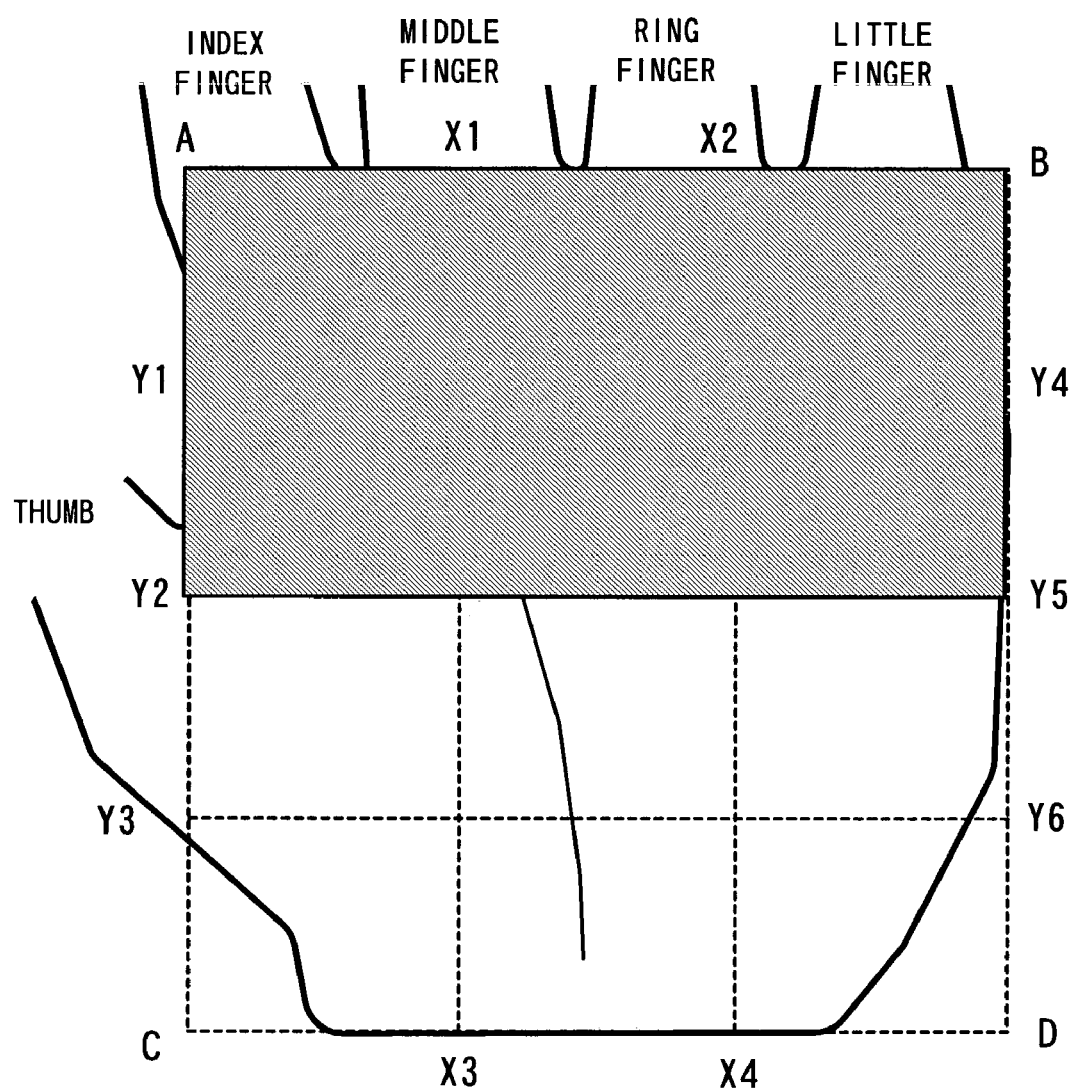
FIG. 5 is a diagram illustrating the first region obtained by the region splitting process of the present invention.
Figure 6:
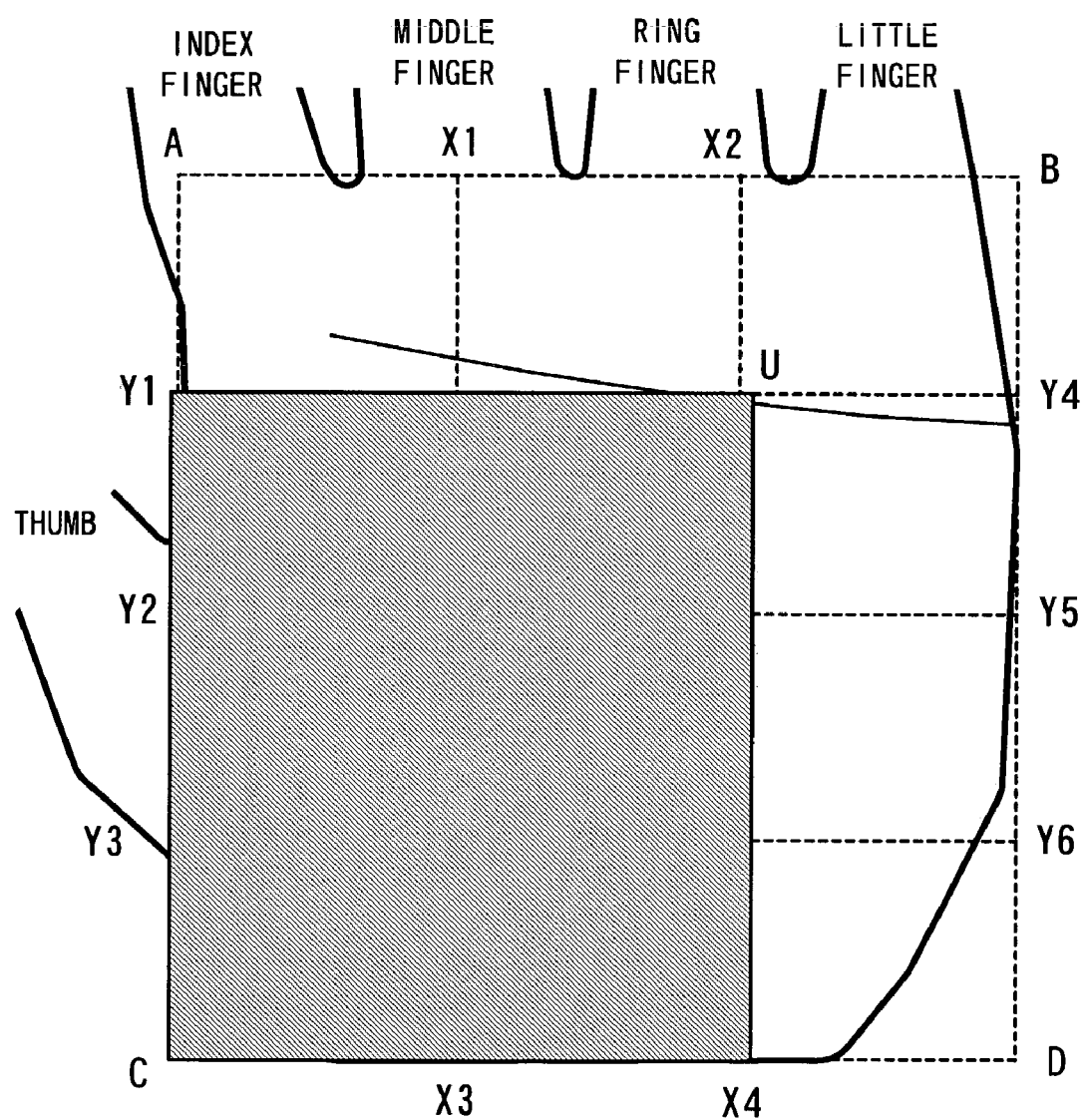
FIG. 6 is a diagram illustrating the second region obtained by the region splitting process of the present invention.
Figure 7:
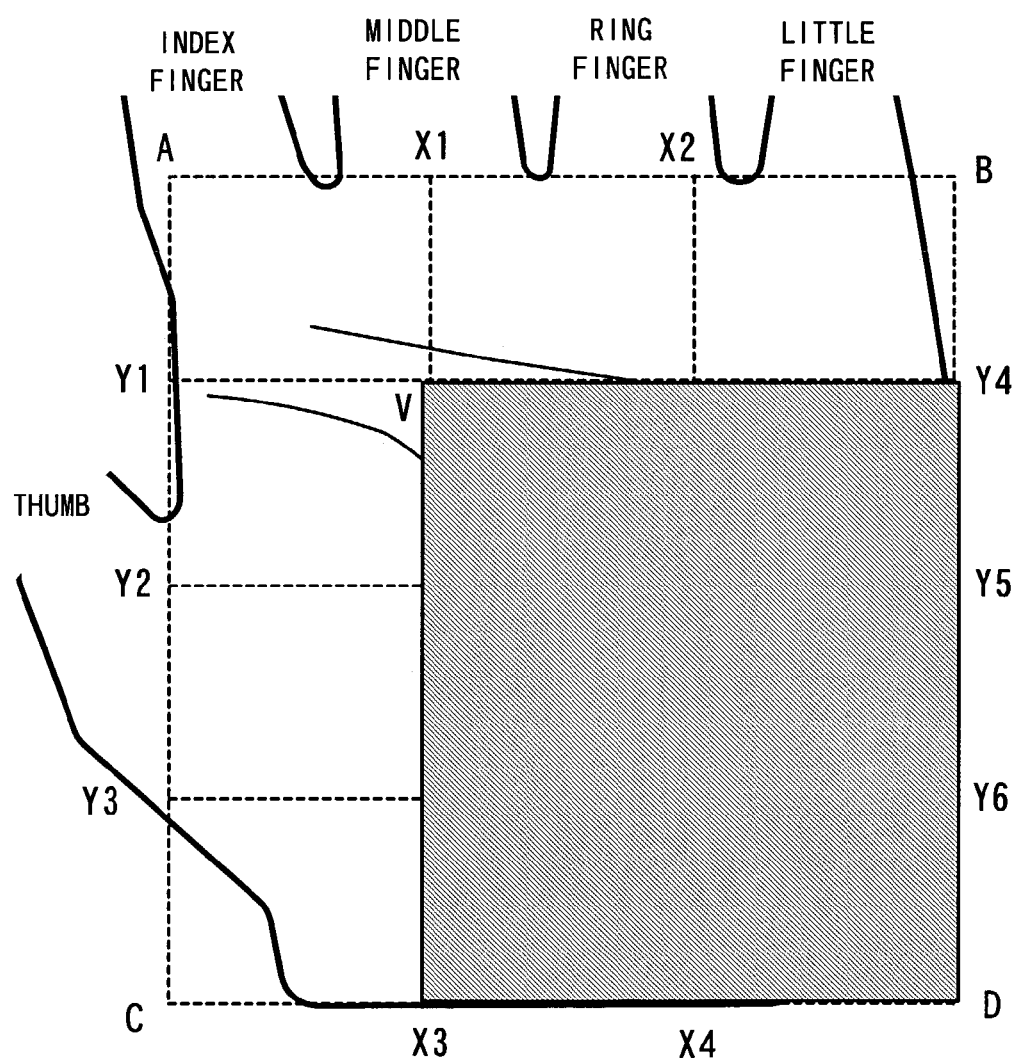
FIG. 7 is a diagram illustrating the third region obtained by the region splitting process of the present invention.

Then, as shown in FIGS. 5 to 7, these segments are divided into three regions. Taking a pattern impression of the right hand palm as an example, the pattern impression is divided into the first region that is a rectangle with the points, A, B, Y2, and Y5, as its vertexes (see FIG. 5); the second region that is a rectangle with the points, Y1 and U (which are the points of intersection between the line X2X4 and the line Y1Y4) and the points, C and X4, as its vertexes (see FIG. 6); and the third region that is a rectangle with the point, V, (which is the point of intersection between the line X1X3 and the line Y1Y4) and the points, Y4, X3, and D, as its vertexes (see FIG. 7).

Figure 8:
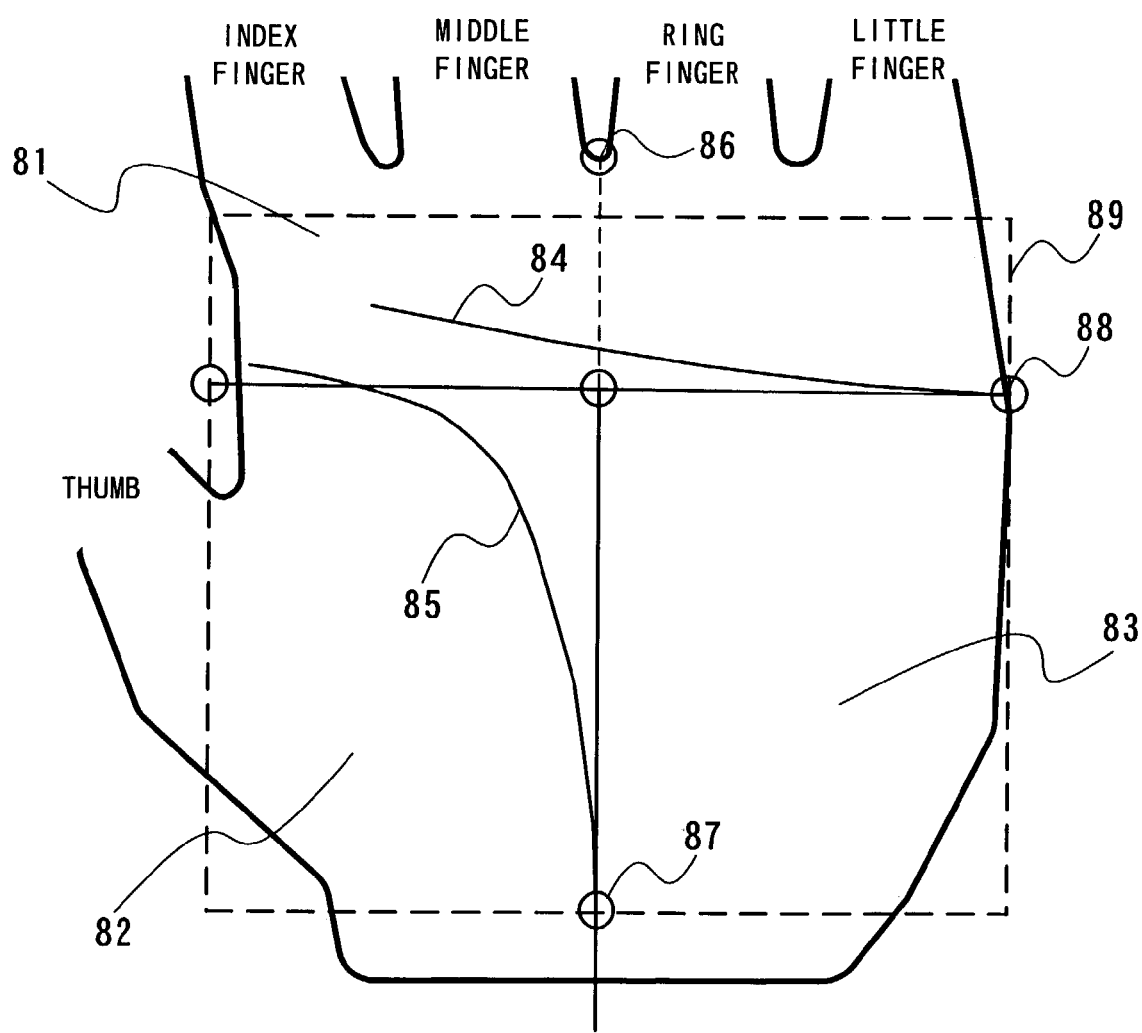
FIG. 8 is a diagram illustrating the conventional region splitting process.

As explained above using FIG. 8, the conventional 3-region splitting process as is disclosed in Japanese Patent No. 002944602, entitled "Method and Apparatus for Registering Palm Pattern Impression," splits a palm pattern impression into three regions, using a pad split line that connects between the impression end point 86 between the middle finger and the ring finger and the point of intersection (arm trident) 87 between the Life line 85 and the wrist-side impression end, and a base split line that is orthogonal to the pad split line and that runs through the point of intersection 88 between the Heart line 84 and the impression end. These regions are called interdigital region 81, thenar region 82, and hypothenar region 83.

In this embodiment, the first region includes the interdigital region 81, the second region includes the thenar region 82, and the third region includes the hypothenar region 83.

Therefore, even when the conventional corresponding data are used as those for the first, second, and third regions, the search and collation process can be conducted without any problems for palm pattern identification purposes.

Major factors that contributed to our success in developing such a method include the reduction in the cost of storage devices that are used as storage means in a palm pattern database and the dramatic improvement in the computation speed of computer systems. Thanks to these factors, searching a database configured to store information that is more redundant than ever has become possible at practical level. These factors also contributed to reducing the constraints that in the past led to the requirements of human hands and expert knowledge.

This embodiment requires rectangle approximations obtained in Step 207 above to be entered manually, depending on the results of the region check in Step 204 above. This requirement should not be considered to be limiting the scope of the present invention. Similarly, when the automated process is conducted, the display process by the image displaying part 12 can be omitted.

If, for example, the ratio of automation is high, the amount of data that must be processed manually is small. In this case, one can use the conventional method if he or she is accustomed to processing using such method. Otherwise, if one has conducted the splitting process without considering seriously and ended up with some information remaining unsplit, he or she can store that information as is in a palm pattern database. In this case, he or she should not allow the machine to specify individual regions to be searched and inquired for that particular palm; instead, he or she can have the machine always make inquiry on all the three regions.

While this embodiment has been described by taking the palm patterns of the right hand as an example, the process of registering the palm patterns of the left hand can be conducted in the same manner, except that the positional relationship between the second and third regions is different.

Furthermore, while, according to the configuration of this embodiment, features are first extracted from the entire input image and then features existing in each of the regions obtained by the region splitting process are selected for storage on a region-to-region basis by the data storing part 15, a different configuration can also be employed in which features are first extracted from each of the regions obtained by the region splitting process and then stored by the data storing part 15.

The functions of the individual means of the apparatus for registering palm pattern impressions according to the present invention can be implemented as hardware components. In addition to this obvious method, these functions can also be implemented by loading a computer program (application: palm pattern impression registering program) for executing the components, i.e., the region splitting part 13 and the feature extracting part 14, onto the memory of a computer system and controlling the CPU of the computer system. This palm impression registering program allows the user to realize the above-described functions by storing it in a magnetic disc, semiconductor memory, or other storing medium, loading it from such storing medium onto a computer processor, and controlling such computer processor.

As described in the foregoing, the functions of splitting a palm pattern impression into multiple regions and registering the features of the palm pattern impression on a region-to-region basis are very important because they have effects of reducing the amount of data required for collation, reducing the time required for collation, and increasing the speed of collation.

According to the present invention, one can conduct the process of splitting a palm impression into multiple regions with ease, and thus it becomes possible to reduce the time required for registration, increase the speed of registration, and reduce radically or even eliminate the need for the work by experts of palm patterns.

This is because the present invention eliminates the necessity of in-depth knowledge of palm patterns and enables data to be utilized by the conventional method by increasing redundancy between regions obtained by splitting a palm pattern impression, by means of focusing on demarcation lines between palm patterns and the background in detecting a rectangular area enclosed by such demarcation lines and then identifying the above-mentioned regions by combining segments created by splitting the rectangular area.

By this, it becomes possible to automatically register palm pattern impression images and radically reducing the necessity of the intervention by experts.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A method for registering palm pattern impressions impressed by each of different individuals who are subject to personal identification, comprising:
   detecting a rectangular area enclosed by a pair of horizontal lines on a wrist side and a fingertip side and a pair of vertical lines on a thumb side and a little finger side that are orthogonal to said horizontal lines;
   splitting said rectangular area into segments using lines that are parallel to said horizontal lines and said vertical lines, respectively;
   splitting said palm pattern impression into multiple regions by merging said segments according to predetermined combinations, wherein at least two of said multiple regions overlap a common portion within said rectangular area; and
   registering features extracted from each of the regions as feature information on a region-to-region basis.

2. The method for registering palm pattern impressions as set forth in claim 1, further comprising:
   detecting said rectangular area as an area enclosed by a pair of parallel horizontal lines that are obtained by approximating wrist-side and fingertip-side demarcation lines between the palm pattern impressions and a background, and a pair of parallel vertical lines that are orthogonal to said horizontal lines and that are obtained by approximating thumb-side and little-finger-side demarcation lines between the palm pattern impression and the background.

3. The method for registering palm pattern impressions as set forth in claim 1, further comprising:
   registering said feature information by associating with personal identification information input separately.

4. The method for registering palm pattern impressions as set forth in claim 1, further comprising:
   detecting said rectangular area as an area enclosed by a pair of parallel horizontal lines that are obtained by approximating wrist-side and fingertip-side demarcation lines between the palm pattern impression and a background, and a pair of parallel vertical lines that are orthogonal to said horizontal lines and that are obtained by approximating thumb-side and little-finger-side demarcation lines between the palm pattern impression and the background; and
   registering said feature information by associating with personal identification information input separately.

5. The method for registering palm pattern impressions as set forth in claim 1, further comprising:
   splitting said rectangular area into a total of twelve segments, arranged with three segments horizontally by four segments vertically, using two equidistant lines that are parallel to said horizontal lines and three equidistant lines that are parallel to said vertical lines; and
   splitting said palm pattern impression into three regions, a first region being a combination of three segments horizontally by two segments vertically that are located toward the fingertip among said segments, a second region being a combination of two segments horizontally by three segments vertically that are located toward the thumb and the wrist among said segments, and a third region being a combination of two segments horizontally by three segments vertically that are located toward the little finger and the wrist among said segments.

6. The method for registering palm pattern impressions as set forth in claim 1, further comprising:
   detecting said rectangular area as an area enclosed by a pair of parallel horizontal lines that are obtained by approximating wrist-side and fingertip-side demarcation lines between the palm pattern impression and a background, and a pair of parallel vertical lines that are orthogonal to said horizontal lines and that are obtained by approximating thumb-side and little-finger-side demarcation lines between the palm pattern impression and the background;
   splitting said rectangular area into a total of twelve segments, arranged with three segments horizontally by four segments vertically, using two equidistant lines that are parallel to said horizontal, lines and three equidistant lines that are parallel to said vertical lines; and
   splitting said palm pattern impression into three regions, a first region being a combination of three segments horizontally by two segments vertically that are located toward the fingertip among said segments, a second region being a combination of two segments horizontally by three segments vertically that are located toward the thumb and the wrist among said segments, and a third region being a combination of two segments horizontally by three segments vertically that are located toward the little finger and the wrist among said segments.

7. The method for registering palm pattern impressions as set forth in claim 1, further comprising:
   registering said feature information by associating with personal identification information input separately;
   splitting said rectangular area into a total of twelve segments, arranged with three segments horizontally by four segments vertically, using two equidistant lines that are parallel to said horizontal lines and three equidistant lines that are parallel to said vertical lines; and
   splitting said palm pattern impression into three regions, a first region being a combination of three segments horizontally by two segments vertically that are located toward the fingertip among said segments, a second region being a combination of two segments horizontally by three segments vertically that are located toward the thumb and the wrist among said segments, and a third region being a combination of two segments horizontally by three segments vertically that are located toward the little finger and the wrist among said segments.

8. The method for registering palm pattern impressions as set forth in claim 1, further comprising:
   detecting said rectangular area as an area enclosed by a pair of parallel horizontal lines that are obtained by approximating wrist-side and fingertip-side demarcation lines between the palm pattern impression and a background, and a pair of parallel vertical lines that are orthogonal to said horizontal lines and that are obtained by approximating thumb-side and little-finger-side demarcation lines between the palm pattern impression and the background;
   registering said feature information by associating with personal identification information input separately;
   splitting said rectangular area into a total of twelve segments, arranged with three segments horizontally by four segments vertically, using two equidistant lines that are parallel to said horizontal lines and three equidistant lines that are parallel to said vertical lines; and splitting said palm pattern impression into three regions, a first region being a combination of three segments horizontally by two segments vertically that are located toward the fingertip among said segments, a second region being a combination of two segments horizontally by three segments vertically that are located toward the thumb and the wrist among said segments, and a third region being a combination of two segments horizontally by three segments vertically that are located toward the little finger and the wrist among said segments.

9. An apparatus for registering palm pattern impressions impressed by each of different individuals who are subject to personal identification, comprising:

image displaying means for displaying said palm pattern impression as image data;

region splitting means for detecting a rectangular area enclosed by a pair of horizontal lines on a wrist side and a fingertip side and a pair of vertical lines on the thumb side and the little finger side that are orthogonal to said horizontal lines, splitting said rectangular area into segments, using lines that are parallel to said horizontal lines and said vertical lines respectively, and splitting said palm pattern impression into multiple regions by merging said segments individually according to the pre-determined combinations, wherein at least two of said multiple regions overlap a common portion within said rectangular area;

feature extracting means for extracting features of said palm pattern impressions; and data storing means for registering the features extracted from each of the regions by said feature extracting means that are obtained by splitting by said region splitting means as feature information on a region-to-region basis.

10. The apparatus for registering palm pattern impressions as set forth in claim 9, wherein said region splitting means detects said rectangular area as an area enclosed by a pair of parallel horizontal lines that are obtained by approximating wrist-side and fingertip-side demarcation lines between the palm pattern impression and a background, and a pair of parallel vertical lines that are orthogonal to said horizontal lines and that are obtained by approximating thumb-side and little-finger-side demarcation lines between the palm pattern impression and the background.

11. The apparatus for registering palm pattern impressions as set forth in claim 9, wherein said data storing means registers said feature information by associating with personal identification information input separately.

12. The apparatus for registering palm pattern impressions as set forth in claim 9, wherein said region splitting means splits said rectangular area into a total of twelve segments, arranged with three segments horizontally by four segments vertically, using two equidistant lines that are parallel to said horizontal lines and three equidistant lines that are parallel to said vertical lines, and splits said palm pattern impression into three regions, a first region being a combination of three segments horizontally by two segments vertically that are located toward a fingertip among said segments, a second region being a combination of two segments horizontally by three segments vertically that are located toward a thumb and a wrist among said segments, and a third region being a combination of two segments horizontally by three segments vertically that are located toward the little finger and the wrist among said segments.

13. An apparatus for registering palm pattern impressions impressed by each of different individuals who are subject to personal identification, comprising:

image displaying means for displaying said palm pattern impression as image data;

region splitting means, when receiving input of information about a rectangular area enclosed by a pair of horizontal lines on a wrist side and a fingertip side and a pair of vertical lines on a thumb side and a little finger side that are orthogonal to said horizontal lines, for splitting said rectangular area into segments, using lines that are parallel to said horizontal lines and said vertical lines respectively, and splitting said palm pattern impression into multiple regions by merging said segments individually according to pre-determined combinations, wherein at least two of said multiple regions overlap a common portion within said rectangular area;

feature extracting means for extracting features of said palm pattern impressions; and data storing means for registering the features extracted from each of the regions by said feature extracting means that are obtained by splitting by said region splitting means as feature information on a region-to-region basis.

14. The apparatus for registering palm pattern impressions as set forth in claim 13, wherein said region splitting means accepts information concerning said rectangular area enclosed by a pair of parallel horizontal lines that are obtained by approximating wrist-side and fingertip-side demarcation lines between the palm pattern impression and a background, and a pair of parallel vertical lines that are orthogonal to said horizontal lines and that are obtained by approximating thumb-side and little-finger-side demarcation lines between the palm pattern impression and the background.

15. The apparatus for registering palm pattern impressions as set forth in claim 13, wherein said data storing means registers said feature information by associating with personal identification information input separately.

16. The apparatus for registering palm pattern impressions as set forth in claim 13, wherein said region splitting means splits said rectangular area into a total of twelve segments, arranged with three segments horizontally by four segments vertically, using two equidistant lines that are parallel to said horizontal lines and three equidistant lines that are parallel to said vertical lines, and splits said palm pattern impression into three regions, a first region being a combination of three segments horizontally by two segments vertically that are located toward a fingertip among said segments, a second region being a combination of two segments horizontally by three segments vertically that are located toward a thumb and a wrist among said segments, and a third region being a combination of two segments horizontally by three segments vertically that are located toward a little finger and the wrist among said segments.

17. A palm pattern impression registering program on a computer readable medium for execution on computer to conduct a method for registering palm pattern impression impressed by each of different individuals who are subject to personal identification, comprising:

when performing functions of splitting said palm pattern impression into pre-determined multiple regions and registering features extracted from each of the regions as feature information on a region-to-region basis;

detecting a rectangular area enclosed by a pair of parallel horizontal lines that are obtained by approximating wrist-side and fingertip-side demarcation lines between the palm pattern impression and a background, and a pair of parallel vertical lines that are orthogonal to said horizontal lines and that are obtained by approximating thumb-side and little-finger-side demarcation lines between the palm pattern impression and the background;

splitting said rectangular area into segments using lines that are parallel to said horizontal lines and said vertical lines, respectively; and splitting said palm pattern impression into multiple regions by merging said segments according to predetermined combinations, wherein at least two of said multiple regions overlap a common portion within said rectangular area.

18. The palm pattern impression registering program as set forth in claim 17, comprising registering said feature information by associating with personal identification information input separately.

19. The method for registering palm pattern impressions as set forth in claim 1, comprising:

splitting said rectangular area into a total of twelve segments, arranged with three segments horizontally by four segments vertically, using two equidistant lines that are parallel to said horizontal lines and three equidistant lines that are parallel to said vertical lines; and splitting said palm pattern impression into three regions, a first region being a combination of three segments horizontally by two segments vertically that are located toward a fingertip among said segments, a second region being a combination of two segments horizontally by three segments vertically that are located toward a thumb and a wrist among said segments, and a third region being a combination of two segments horizontally by three segments vertically that are located toward the little finger and the wrist among said segments.

* * * * *